(12) United States Patent
Koshimizu et al.

(10) Patent No.: US 10,663,381 B2
(45) Date of Patent: May 26, 2020

(54) HARDNESS TESTER AND PROGRAM (71) Applicant: MITUTOYO CORPORATION, Kanagawa (JP)

(72) Inventors: Fumihiko Koshimizu, Kanagawa (JP); Koji Shinza, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 222 days.

(21) Appl. No.: 15/933,871

(22) Filed: Mar. 23, 2018

(65) Prior Publication Data
US 2018/0284000 A1 Oct. 4, 2018

(30) Foreign Application Priority Data
Mar. 28, 2017 (JP) .................................. 2017-062408

(51) Int. Cl.
*G01N 3/06* (2006.01)
*G01N 3/42* (2006.01)

(52) U.S. Cl.
CPC .............. *G01N 3/068* (2013.01); *G01N 3/42* (2013.01); *G01N 2203/008* (2013.01); *G01N 2203/0647* (2013.01)

(58) Field of Classification Search
None
See application file for complete search history.

(56) References Cited

U.S. PATENT DOCUMENTS

| 4,945,490 A * | 7/1990 | Biddle, Jr. ............... | G01N 3/42 356/626 |
| 2004/0096093 A1* | 5/2004 | Hauck ....................... | G01N 3/08 382/141 |
| 2005/0081608 A1* | 4/2005 | Shoelson ............... | B82Y 35/00 73/105 |
| 2006/0171579 A1* | 8/2006 | Lee .......................... | G01N 3/42 382/141 |
| 2011/0178728 A1* | 7/2011 | Sawa ....................... | G01N 3/42 702/41 |
| 2012/0087567 A1* | 4/2012 | Takemura ................ | G01N 3/42 382/141 |
| 2012/0101743 A1* | 4/2012 | Sawa ....................... | G01N 3/42 702/41 |

(Continued)

FOREIGN PATENT DOCUMENTS

JP 2000-146793 A 5/2000

*Primary Examiner* — Paul M. West
*Assistant Examiner* — Mark A Shabman
(74) *Attorney, Agent, or Firm* — Greenblum & Bernstein, P.L.C.

(57) ABSTRACT

A hardness tester includes an image acquirer acquiring an image of a surface of a sample captured by an image capturer, a test area definer defining a test area where the hardness test is performed with respect to the image of the surface of the sample displayed by a display which displays the acquired image of the surface, a test setting acquirer acquiring estimated hardness of the sample and test force when the hardness test is performed, an estimator estimating a size of the indentation to be formed on the surface of the sample based on the acquired test force and the estimated hardness, and a display controller displaying an image picture of the indentation to be formed, based on the estimated size of the indentation superimposed on the image of the surface of the sample displayed by the display.

12 Claims, 7 Drawing Sheets

(56) References Cited

U.S. PATENT DOCUMENTS

2014/0013834 A1\* 1/2014 Koshimizu .............. G01N 3/42
                                                                             73/81
2014/0250989 A1\* 9/2014 Tsujii ....................... G01N 3/42
                                                                             73/81

\* cited by examiner

HARDNESS TESTER AND PROGRAM

CROSS-REFERENCE TO RELATED APPLICATIONS

The present application claims priority under 35 U.S.C. § 119 of Japanese Application No. 2017-062408, filed on Mar. 28, 2017, the disclosure of which is expressly incorporated by reference herein in its entirety.

BACKGROUND OF THE INVENTION

1. Field of the Invention

The present invention relates to a hardness tester and a program.

2. Description of Related Art

A conventional hardness tester is known which measures hardness of a sample based on dimensions of an indentation formed by pressing an indenter against the sample (work piece) with a predetermined test force. For example, a Vickers hardness tester measures a length of diagonal lines of an indentation formed by pressing a square pyramidal indenter into a sample surface, and calculates hardness based on the measured length of diagonal lines of the indentation.

In the hardness tester mentioned above, a location and a layout of the hardness test is defined while observing an image of the sample surface. At that point, with respect to the area where the test is performed, test setting guidance and the like is known as a tool to check in advance whether or not the actual test to be performed is established. For functions for the test setting guidance, for example, a size, depth, or the like of the indentation to be formed is calculated based on the test force and estimated hardness of the sample (see Japanese Patent Laid-open Publication No. 2000-146793).

However, the above-mentioned conventional technology only expresses a calculation result in a numerical value, and failed to visually express what the image of the indentation size is like with respect to the actual observed image. In other words, it is difficult to compare the area where the test is performed with the image of the numerical value only, and therefore, there has been a situation where the indentation is formed extending beyond the area where the test is to be performed, when the actual test is performed. In addition, when a magnification of the observed image differs between the test setting guidance and the actual test, there is a risk of making an erroneous estimate because the image of the indentation size is also different.

SUMMARY OF THE INVENTION

The present invention provides a hardness tester and a program capable of achieving work efficiency by simplifying determination as to whether the test setting is appropriate.

One aspect of the present invention, which was conceived to resolve the above-noted situation, is a hardness tester measuring hardness of a sample by forming an indentation by loading a predetermined test force on a sample surface with an indenter, and by measuring dimensions of the indentation. The hardness tester includes: an image acquirer acquiring an image of the surface of the sample captured by an image capturer; a display displaying the image of the surface of the sample acquired by the image acquirer; a test area definer defining a test area where the hardness test is to be performed with respect to the image of the surface of the sample displayed by the display; a test setting acquirer acquiring the estimated hardness of the sample and test force when the hardness test is performed; an estimator estimating a size of the indentation to be formed on the surface of the sample based on the test force and the estimated hardness acquired by the test setting acquirer; and a display controller displaying an image picture of the indentation to be formed, based on the size of the indentation estimated by the estimator, the image picture being superimposed on the image of the surface of the sample displayed by the display.

According to another aspect of the present invention, the hardness tester includes an image adjuster adjusting a size of the image picture displayed by the display controller, and a test force adjuster adjusting the test force based on the size of the image picture adjusted by the image adjuster.

According to another aspect of the present invention, in the hardness tester, the display controller further displays additional information to express the size of the image picture on the image of the surface of the sample displayed by the display.

According to another aspect of the present invention, in the hardness tester, the display controller displays the image picture superimposed on a predetermined position outside the test area defined by the test area definer, the predetermined position being in the image of the surface of the sample displayed by the display, and a test position adjuster is provided to adjust a display position of the image picture displayed by the display controller at the predetermined position.

Another aspect of the present invention is a program, enabling a computer of a hardness tester, which measures hardness of a sample by forming an indentation by loading a predetermined test force on a surface of the sample with an indenter, and by measuring dimensions of the indentation, to act as: an image acquirer acquiring an image of the surface of the sample captured by an image capturer; a test area definer defining a test area where the hardness test is to be performed with respect to the image of the surface of the sample displayed by a display which displays the image of the surface of the sample acquired by the image acquirer; a test setting acquirer acquiring the estimated hardness of the sample and test force when the hardness test is performed; an estimator estimating a size of the indentation to be formed on the surface of the sample based on the test force and the estimated hardness acquired by the test setting acquirer; and a display controller displaying an image picture of the indentation to be formed, based on the size of the indentation estimated by the estimator, the image picture being superimposed on the image of the surface of the sample displayed by the display.

The present invention provides a hardness tester and a program capable of achieving work efficiency by simplifying a determination whether or not a test setting is appropriate.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings.

1. Description of Configuration

Figure 1:
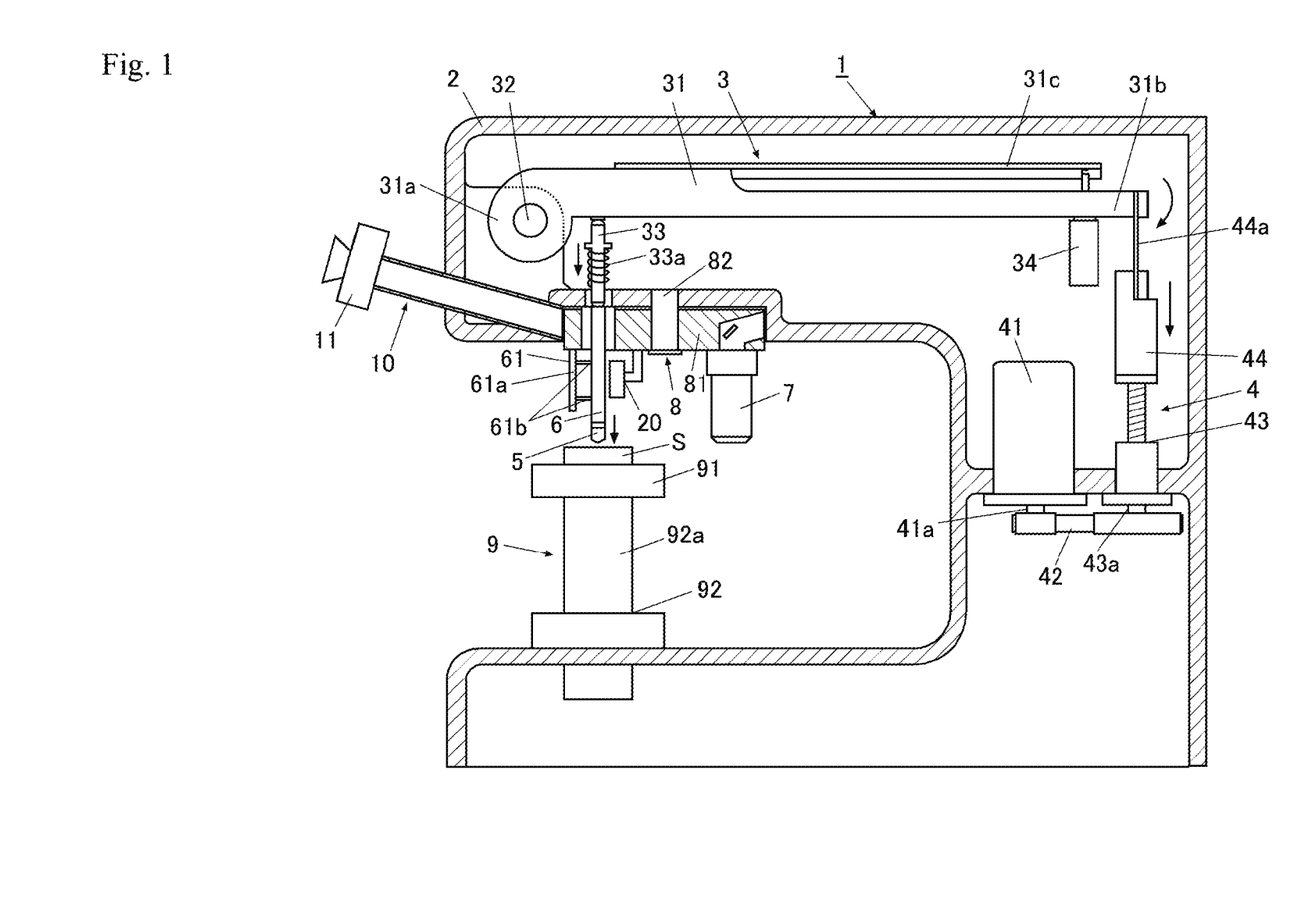
FIG. 1 is a side view illustrating an overall configuration of a hardness tester according to the present invention.
Figure 2:
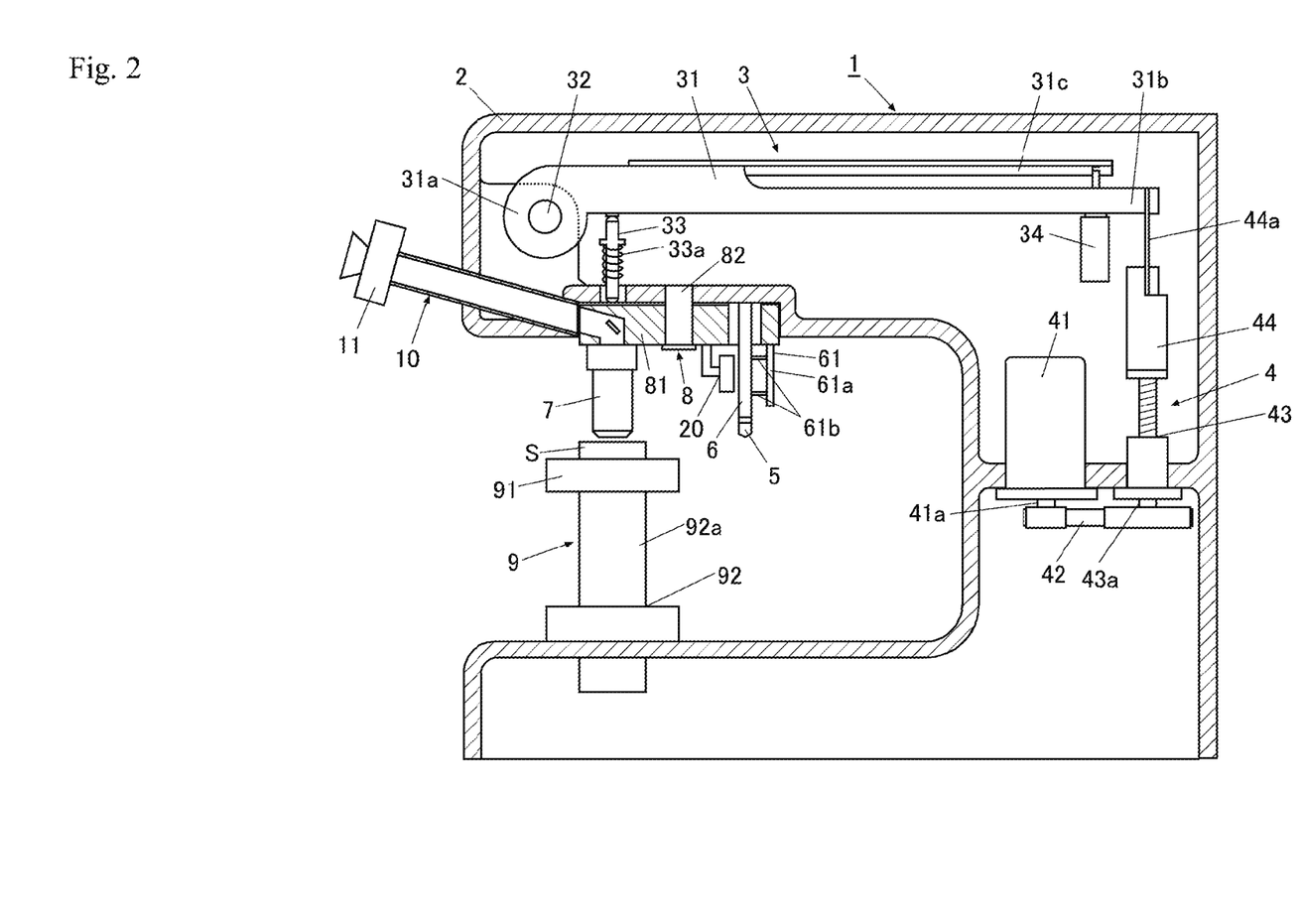
FIG. 2 is a side view illustrating an overall configuration of the hardness tester according to the present invention.
Figure 3:
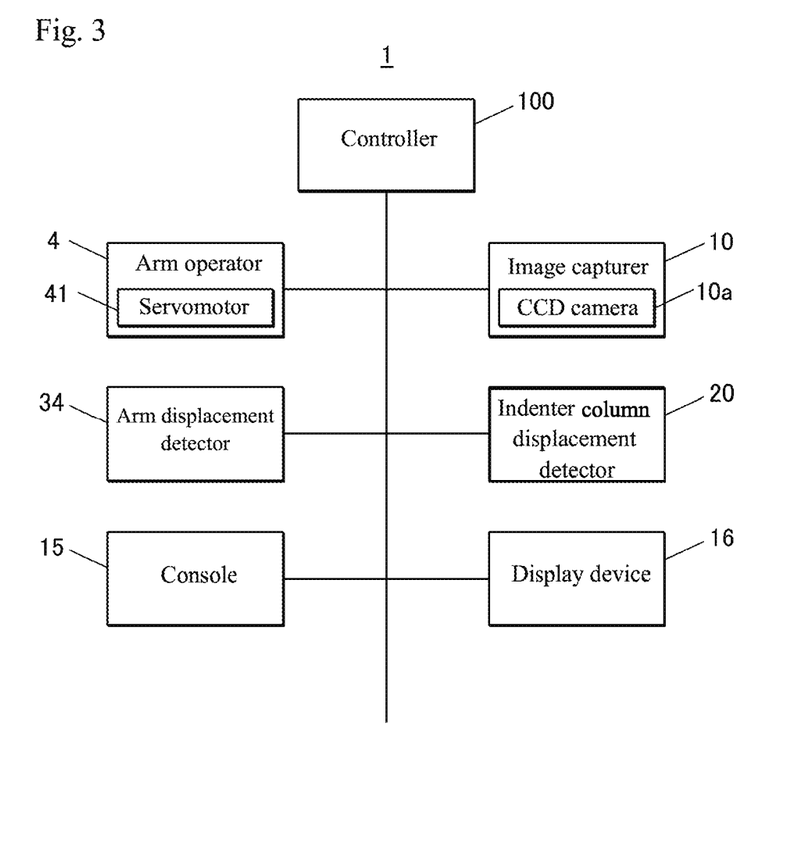
FIG. 3 is a block diagram illustrating a control structure of the hardness tester according to the present invention.

As shown in FIGS. 1 to 3, a hardness tester 1 according to the present embodiment is configured with a tester main body 2 to which various components are provided, a load arm 3 pivotably supported by the tester main body 2, an arm operator 4 which applies a work force (test force) to the load arm 3 and operates the load arm 3, a turret 8 rotatably provided to the tester main body 2 below the load arm 3, an indenter column 6 attached to the turret 8 and provided with an indenter 5 on a forefront end thereof, an object lens 7 attached to the turret 8, a sample stage 9 arranged opposite to the turret 8 and on which a sample S is placed, an image capturer 10 capturing an image of an indentation formed on the sample S on the sample stage 9, a console 15 inputting the test force and estimated hardness of the sample S, a display device 16 displaying the image of the indentation to be formed on the surface of the sample S, and a controller 100. In the hardness tester 1, the controller 100 controls operations of various components.

The load arm 3 is configured to include an arm main body 31 and a pivot axis 32 supporting a first end portion 31a of the arm main body 31 in the tester main body 2. The other side of the arm main body 31 is divided into a first second end portion 31b and a second second end portion 31c. The first second end portion 31b is formed into a plate spring which is flexible. On the bottom surface side of the arm main body 31, a load axis 33 is provided between the bottom surface of the arm main body 31 and the tester main body 2, the load axis 33 being elastically supported by a coil spring 33a. In addition, an arm displacement detector 34 is provided to the arm main body 31, the arm displacement detector 34 detecting an opening degree between the first second end portion 31b and the second second end portion 31c when the load arm 3 (arm main body 31) operates.

In the arm main body 31, the first end portion 31a is pivotably supported in the tester main body 2 via the pivot axis 32, and the arm operator 4 is connected to the first second end portion 31b, the arm operator 4 generating the work force as the test force which operates the load arm 3. Then, the arm main body 31 performs rotation centered on the pivot axis 32 in conjunction with the movement of the arm operator 4. The arm main body 31, in conjunction with the downward rotation of the arm main body 31, displaces the load axis 33 downward by pressing the load axis 33. The load axis 33 transmits a drive and operation of the arm main body 31 (load arm 3) to the indenter column 6 (see FIG. 1).

The arm displacement detector 34 is configured to include an scale carved with calibration marks at predetermined intervals, and a linear encoder optically reading the calibration marks on the scale. The arm displacement detector 34 detects the opening degree (displacement amount of spring) between the first second end portion 31b and the second second end portion 31c when the indenter 5 is pressed into the sample S via the indenter column 6 or the like. The arm displacement detector 34 outputs an arm displacement signal based on the detected opening degree to the controller 100. Moreover, the opening degree corresponds to a pressing force (test force) pressing the indenter 5 into the sample S or the load added to the sample S.

The arm operator 4 is configured to include a servomotor 41, a ball screw 43, a timing belt 42 stretched between a motor axis 41a of the servomotor 41 and a screw axis 43a of the ball screw 43, and a fixture 44 supported by the ball screw 43. The arm operator 4 is connected to the load arm 3 by fixating the plate spring 44a of the fixture 44 to the first second end portion 31b of the arm main body 31.

The servomotor 41 is driven based on a drive control signal input by the controller 100. The motor axis 41a of the servomotor 41 is rotated by a drive from the servomotor 41. The driving force of the motor axis 41a is transmitted to the screw axis 43a of the ball screw 43 via the timing belt 42 and rotates the ball screw 43. The fixture 44 is displaced vertically according to a rotational drive from the ball screw 43. In this way, the arm operator 4 displaces the fixture 44 upward and downward based on the drive of the servomotor 41, transmits the drive (driving force) to the first second end portion 31b of the arm main body 31 which is connected to the fixture 44, and rotates the arm main body 31 (load arm 3). Moreover, the plate spring 44a is configured to bend when the arm operator 4 operates the load arm 3.

The sample stage 9 includes a sample stage 91 on which the sample S is placed and a stage elevating portion 92 provided to a bottom surface of the sample stage 91. The stage elevating portion 92 includes a screw portion 92a and allows the sample stage 91 to displace vertically with respect to the tester main body 2 by rotating the screw portion 92a.

The turret 8 includes a turret main body 81 and a rotation axis 82 rotatably supporting the turret main body 81 in the tester main body 2. The turret main body 81 includes the indenter column 6, object lens 7, and the indenter column displacement detector 20 which detects a displacement amount of the indenter column 6. The indenter column 6 is provided to the turret main body 81 via an indenter column holder 61. The turret main body 81 is capable of switching arrangement of the indenter column 6 or the objective lens 7 by rotating centered on the rotation axis 82.

The indenter column holder 61 includes a vertical holding member 61a and plate springs 61b extending horizontally from the vertical holding member 61a. The indenter column 6 is elastically supported by the plate springs 61b of the indenter column holder 61 and is vertically provided on the placement surface for the sample S on the sample stage 91, especially on the surface (top surface) of the sample resting atop the sample stage 91. The indenter 5 is provided so as to be swapped out at the bottom end of the indenter column 6. For example, when performing a Vickers hardness test, the present embodiment uses a quadrangular pyramidal Vickers indenter (with opposing angles of 136±0.5° as the indenter 5. The present embodiment uses the quadrangular pyramidal Vickers indenter as the indenter 5. As shown in FIG. 1, the hardness tester 1 rotates the turret 8 (turret main body 81) and switches the indenter column 6 to be arranged at a position corresponding to the load axis 33, thereby allowing the work force of the operation to be transmitted to the indenter column 6 when the load axis 33 moves downward along with the rotation of the load arm 3. Accordingly, the hardness tester 1 can press the indenter 5 into the sample S.

The objective lens 7 is a lens portion attached to a microscope 11 of the image capturer 10. As shown in FIG. 2, the hardness tester 1 rotates the turret 8 (turret main body 81) and switches the objective lens 7 to be arranged to a position corresponding to the image capturer 10, thereby allowing the image capturer 10 to capture the image of the sample S.

The indenter column displacement detector 20 is configured to include an scale carved with calibration marks at predetermined intervals, and a linear encoder optically reading the calibration marks on the scale. The indenter column displacement detector 20 detects a displacement amount (i.e., an amount of ingress of the indenter 5 being pressed into the sample S and indentation depth) when the indenter column 6 forms the indentation in the sample S, then outputs to the controller 100 an indenter column displacement signal based on the detected displacement amount.

The image capturer 10 is configured to include the microscope 11, a CCD camera 10a attached to the microscope 11, and an illumination device (not shown in the drawings) illuminating an observation position of the sample S. The image capturer 10 captures the image of the indentation formed on the surface of the sample S. The image capturer 10 (CCD camera 10a) outputs the captured image of the indentation to the controller 100.

The console 15 includes a pointing device such as a keyboard and a mouse and receives an operation input from a worker (operator) when a hardness test is performed. For example, the console 15 receives the operation input of the test force and the estimated hardness of the sample S estimated by the worker. When a predetermined operation input performed by the worker is received, the console 15 generates a predetermined operation signal corresponding to the operation input and outputs the predetermined operation signal to the controller 100.

The display device (display) 16 is configured by a display apparatus such as an LCD (Liquid Crystal Display), for example. The display device 16 displays hardness test settings input to the console 15, results of the hardness test, image of the sample S surface and the image of the indentation formed on the sample S surface captured by the CCD camera 10a, and the like.

As shown in FIG. 3, the controller 100 is configured to include a CPU, a RAM, and a ROM. The controller 100 has a function of conducting an operation control and the like to perform a predetermined hardness test by executing a predetermined program stored in the ROM.

For example, the controller 100 compares the arm displacement signal input by the arm displacement detector 34 to a defined arm displacement data set in advance. The controller 100 outputs to the servomotor 41 the drive control signal to control driving of the arm operator 4 (servomotor 41) in order to rotate the load arm 3 so as to activate the indenter 5 on the sample S with the predetermined test force (load).

In addition, the controller 100 vertically displaces the sample stage 9 (sample stage 91) by controlling the stage elevating portion 92 and changes a relative distance between the sample stage 91 and the objective lens 7, thereby enabling an autofocus function which focuses on the surface of the sample S which is resting on the sample stage 91.

Further, the controller 100 analyzes by performing a predetermined image processing to the indentation image input by the image capturer 10, performs an automatic measurement of a size (dimension) of the indentation, and detects the distance between predetermined feature positions. Furthermore, the controller 100 calculates the hardness of the sample S based on the distance between the predetermined feature positions of the detected indentation. Specifically, the controller 100 measures the hardness of the sample S from the size (distance between predetermined feature positions) of the indentation formed by pressing the indenter 5 into the sample S. For example, the hardness of the sample is calculated based on the Vickers hardness test.

2. Description of Operation

Figure 4:
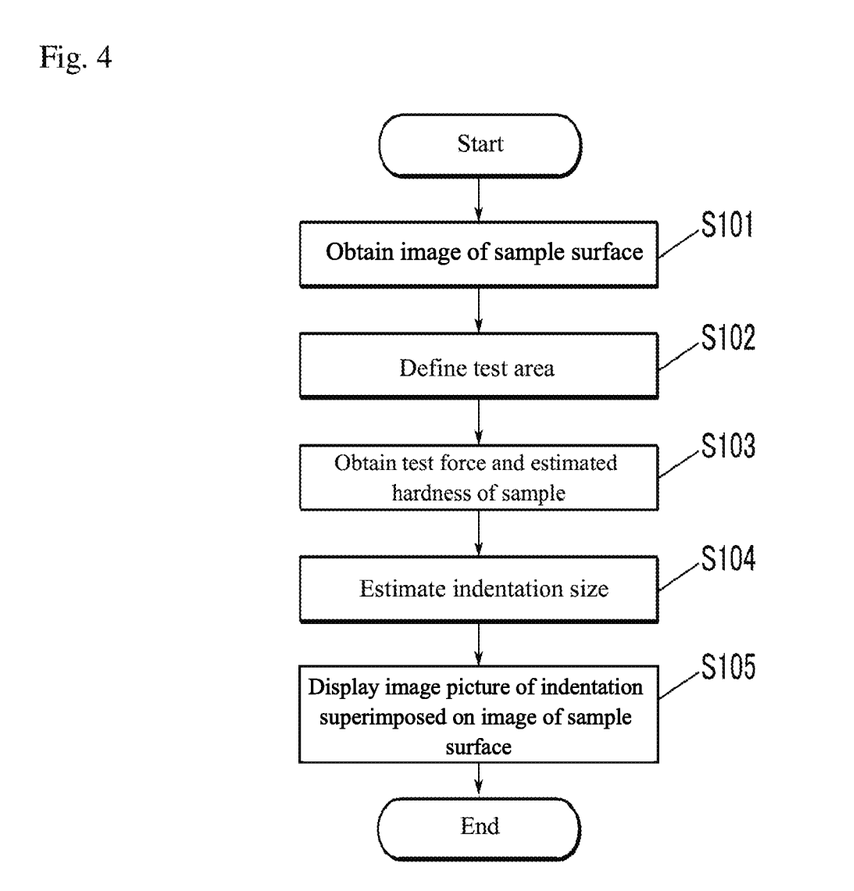
FIG. 4 is a flow chart illustrating operations of the hardness tester according to the present invention.

Next, operations of the hardness tester 1 according to the present embodiment are described with reference to the flow chart in FIG. 4. For example, the process starts when the controller 100 detects a selection operation of a preliminary information display mode through the console 15 by the worker. In this example, the preliminary information display mode is a mode to realize a display function, when performing the hardness test, by superimposing the image picture of the indentation to be formed on the test position of the image of the sample S surface.

First, the controller 100 obtains the image of the sample S surface captured by the image capturer 10 (step S101). In other words, the controller 100 serves as an image acquirer in the present invention. Specifically, the controller 100 rotates the turret 8 and switches the objective lens 7 to be arranged at a position of the hardness test to perform the test observation (indentation observation), that is a position corresponding to the image capturer 10 (see FIG. 2). Then, the image capturer 10 captures the surface of the sample S resting on the sample stage 91 and outputs the captured image of the sample S surface to the controller 100. The controller 100 then obtains the image of the sample S surface output from the image capturer 10. The image capturer 100 displays the obtained image of the sample S surface on the display device 16.

Next, the controller 100 defines an area where the hardness test is carried out (test area) with respect to the image of the sample S surface displayed on the display device 16 (step S102). Specifically, the controller 100 serves as a test area definer in the present invention. For example, the controller 100 defines the test area according to the predetermined set operation through the console 15 by the worker. At this point, beside the test area, the test position is also defined.

Next, the controller 100 obtains the estimated hardness of the sample S and the test force when the hardness test is performed (step S103). Specifically, the controller 100 serves as a test setting acquirer in the present invention. For example, the controller 100 obtains the estimated hardness of the sample S and the test force input through the console 15 by the worker.

Next, the controller 100 estimates, based on the estimated hardness and the test force obtained in the step S103, the indentation size to be formed on the sample S surface (step S104). Specifically, the controller 100 serves as an estimator in the present invention.

Figure 5:
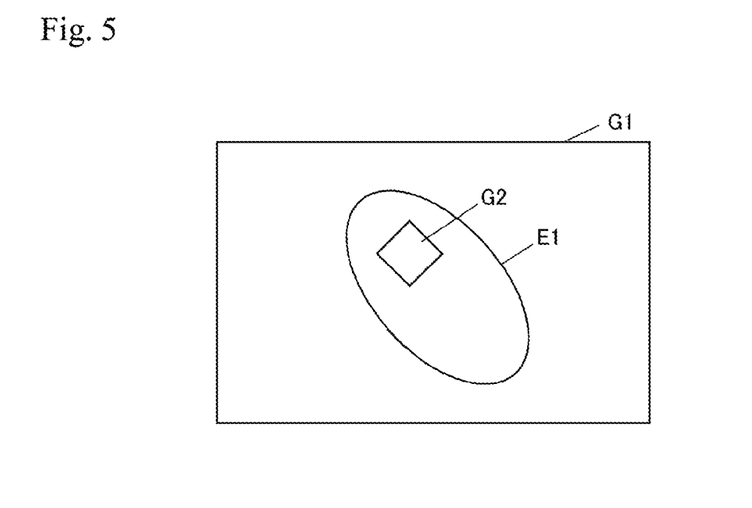
FIG. 5 illustrates an exemplary format where an image picture of an indentation to be formed is displayed superimposed on an image of a sample surface.
Figure 6:
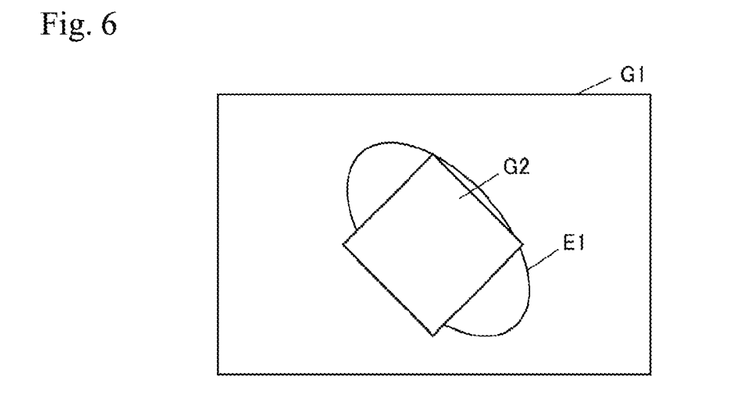
FIG. 6 illustrates another exemplary format where the image picture of the indentation to be formed is displayed superimposed on the image of the sample surface.

Next, the controller 100 displays the image picture of the indentation, formed based on the indentation size estimated in the step S104, superimposed on the test position of the image of the sample S surface (step. S105). Thus, the controller 100 serves as a display controller in the present invention. FIGS. 5 and 6 respectively illustrate an exemplary format where an image picture G2 of the indentation to be formed is displayed superimposed on an image G1 of the surface of the sample S. In FIG. 5, the image picture G2 of the indentation to be formed is fitted inside a test area E1 defined in the step S102. In this case, the worker can determine that the test can be performed with the input test setting (test force and estimated hardness). On the other hand, FIG. 6 shows the image picture G2 of the indentation to be formed is outside the test area E1 defined in the step S102. In this case, the worker can determine that the test is not possible with the input test setting (test force and estimated hardness). With the above processes, the worker can determine whether the test can be performed with the input test setting.

When the test can be performed with the input test setting, the hardness of the sample S is measured based on the dimensions of the indentation after forming the indentation on the surface of the sample S based on the input test setting. On the other hand, when the test is not possible with the input test setting, the test setting is changed according to the input operation by the worker and the processes are repeated until the image picture G2 of the indentation to be formed fits inside the test area E1.

3. Effect

As mentioned above, the hardness tester 1 according to the present embodiment includes the image acquirer (controller 100) acquiring the image of the surface of the sample S which is captured by the image capturer (image capturer 10), the display (display device 16) displaying the image of the surface of the sample S acquired by the image acquirer, the test area definer (controller 100) defining the test area where the hardness test is performed with respect to the image of the surface of the sample S displayed on the display, the test setting acquirer (the controller 100) acquiring the estimated hardness of the sample S and the test force when the hardness test is performed, the estimator (controller 100) estimating, based on the test force and the estimated hardness acquired by the test setting acquirer, the indentation size formed on the sample S surface, and the display controller (controller 100) displaying the image picture of the indentation, formed based on the indentation size estimated by the estimator, superimposed on the image of the surface of the sample S displayed by the display. Therefore, in the hardness tester 1 according to the present embodiment, the indentation size to be formed can be displayed as a visual image, and therefore, the determination can be readily made whether the test setting is appropriate (in other words, whether the hardness teat can be performed) before performing the hardness test. Thus, errors can be avoided before performing the hardness test and thereby saving time of retesting, for example, and increasing work efficiency. In particular, there is a case where performing the retest is difficult when an error occurs, such as when creating an indentation in a small region. But even in such a case, the error can be avoided in advance, and the hardness test can be performed more reliably. In addition, when determining whether the test setting is appropriate or not, the indentation size to be formed can be changed in accordance with the magnification of the objective lens 7 during the observation. Therefore, for example, making a miscalculation can be avoided, where the image of the indentation magnified 10 times by the objective lens 7 to be mistakenly applied to the observed image magnified 20 times by the objective lens 7, and the above determination can be made more appropriately.

In the above, a concrete description is given based on the embodiment according to the present invention. However, the present invention is not limited to the above-described embodiment and can be modified without deviating from the scope of the invention.

4. Modification

Figure 7:
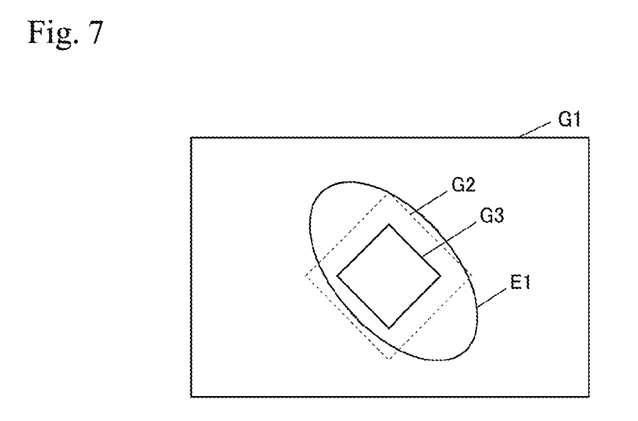
FIG. 7 illustrates an exemplary format where a size of the image picture which is displayed superimposed on the image of the sample surface is reduced.

For example, in the embodiment described above, when it is not possible to perform the test with the input test setting, the input operation of the test setting is performed again. However, the present invention is not limited to this. For example, the image picture G2 of the indentation extending outside the test area E1 can be made smaller by dragging operation of the mouse and the like. As shown in FIG. 7, when a reduction operation is performed such that a reduced image G3 is fitted inside the test area E1, the test force may be adjusted so as to have the test force corresponding to the reduced image G3 (in other words, the test force to form the indentation of the size of the reduced image G3). On the other hand, when the image picture G2 of the indentation is too small, the image can be magnified by dragging operation of the mouse and the like. When a magnified operation is performed, the test force may be adjusted so as to have the test force corresponding to the magnified image (in other words, the test force to form the indentation of the size of the magnified image). Specifically, the controller 100 receives the operation adjusting the size (reduction/magnification) of the displayed image picture G2 and serves as an image adjuster in the present invention adjusting the size of the image picture G2. In addition, the controller 100 serves as a test force adjuster in the present invention adjusting the test force based on the size of the adjusted image picture G2.

As described above, the hardness tester includes the image adjuster (controller 100) adjusting the size of the image picture G2 displayed by the display controller and the test force adjuster (controller 100) adjusting the test force based on the size of the image picture G2 adjusted by the image adjuster, and thereby the worker can readily form the indentation of a desired size, and the work efficiency can be further improved.

In addition to the above, as another method to adjust the size of the displayed image picture G2, when the settable test force is displayed in the image G1 of the surface of the sample S and the worker selects the desired test force using the mouse, the size of the image picture G2 may be adjusted so as to obtain the size corresponding to the test force.

Figure 8:
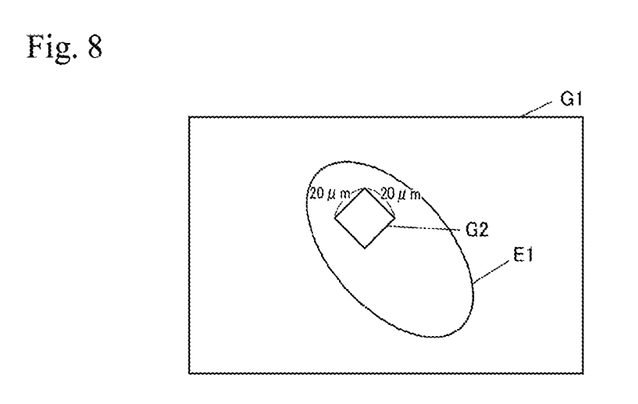
FIG. 8 illustrates an exemplary format where dimensions of the image picture are displayed on the image of the sample surface.

Further, additional information to express (compare) the size of the displayed image picture G2 may be displayed in the image G1 of the surface of the sample S. In this example, dimensions of the image picture G2, scale, image of tobacco and coin, and the like are included as the additional information. As an example of the additional information, FIG. 8 illustrates a format where the dimensions (one side length is 20 μm) of the image picture G2 is displayed in the image G1 of the surface of the sample S.

As described above, the controller 100 further displays the additional information to express the size of the image picture G2 in the image G1 of the surface of the sample S displayed by the display, and thereby the worker can imagine the indentation size more easily and properly determine whether the test setting is appropriate.

Figure 9A:
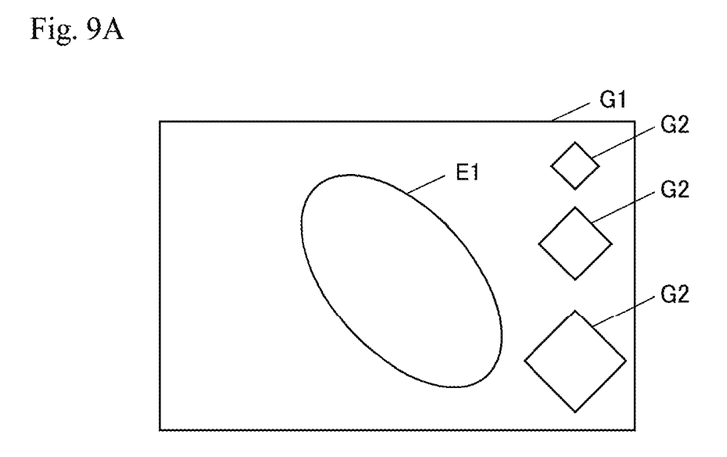
FIGS. 9A and 9B illustrate exemplary formats where the image picture is displayed superimposed on a predetermined position of the image of the sample surface outside a test area.
Figure 9B:
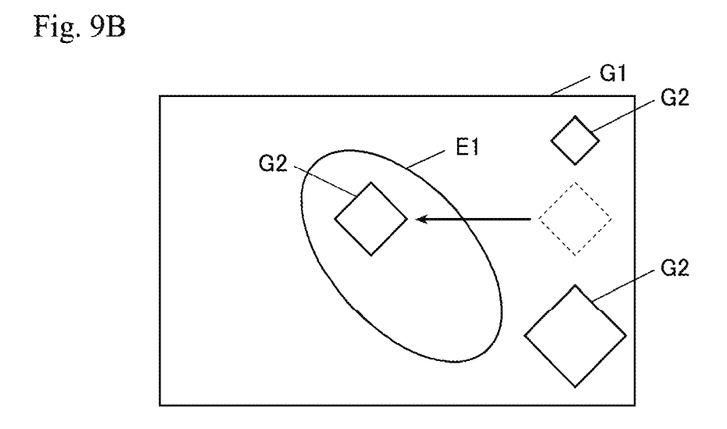

According to the present embodiment, the image picture G2 of the indentation to be formed is displayed superimposed on the test position of the image G1 on the surface of the sample S, however, the present invention is not limited to this. For example, as shown in FIGS. 9A and 9B, instead of the test position, the image picture G2 may be displayed superimposed on a predetermined position outside of the test area E1 (see FIG. 9A) and the image picture G2 is manually moved to a desired test position inside the test area E1 by dragging and the like by the worker (see FIG. 9B). In this case, as shown in FIGS. 9A and 9B, a plurality of image pictures G2 for the respective settable test force (three pictures in FIGS. 9A and 9B) may be displayed (see FIG. 9A) and the worker may move the image picture G2 with the desired size (see FIG. 9B). Specifically, the controller 100 receives the operation to adjust (move) the display position of the image picture G2 which is displayed at the desired test position inside the test area E1, and serves as a test position adjuster in the present invention that adjusts the display position of the image picture G2.

As described above, the controller 100 includes a configuration to display the image picture G2 superimposed on the predetermined position outside the test area E1 defined by the test area definer in the image G1 of the surface of the sample S displayed by the display, and the test position adjuster (controller 100) that adjusts the display position of the image picture G2 displayed by the display controller at the predetermined position. Thereby, the worker can determine the test position as desired while visually confirming the indentation size and readily perform the desired hardness test.

In addition, in the above-described embodiment, a Vickers hardness tester, which includes the indenter 5 having a square planar shape, is described to exemplify the hardness tester 1. However, the present invention is not limited to this. Specifically, the present invention may be applied to any hardness tester measuring hardness of the sample S by forming the indentation on the sample S surface by loading the predetermined test force with the indenter 5 and by measuring the dimension of the indentation. For example, the hardness tester includes a quadrangular pyramid diamond indenter and may be a Knoop hardness tester which includes the indenter having a square planar shape or a Brinell hardness tester which includes the indenter having a spherical shape, similar to the Vickers hardness tester.

In addition, each aspect described in the present application can be understood as a method, a program, and the like. As for a category of the method and the program, "means" indicated in a category of the apparatus is suitable replaced as a "process" or "step", for example. In addition, orders of the process and the step are not limited to that of directly specified in the present application. The orders can be changed and some processes can also be changed to perform at once or one at a time as needed.

In addition, within a scope not deviating from the substance of the present invention, appropriate modifications may also be made to detailed structures and operations of each component configuring the hardness tester.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A hardness tester that measures hardness of a sample by forming an indentation by loading a predetermined test force on a surface of the sample with an indenter, and by measuring dimensions of the indentation, the hardness tester comprising:
    an image acquirer that acquires an image of the surface of the sample captured by an image capturer before the indenter forms the indentation on the sample;
    a display that displays the image of the surface of the sample acquired by the image acquirer before the indenter forms the indentation on the sample;
    a test area definer that defines a test area where the hardness test is to be performed by the indenter with respect to the image of the surface of the sample displayed by the display before the indenter forms the indentation on the sample;
    a test setting acquirer that acquires an estimated hardness of the sample and test force estimated before the actual hardness test is performed by the indenter;
    an estimator that estimates a size of the indentation to be formed on the surface of the sample by the indenter before the indenter forms the indentation on the sample based on the test force and the estimated hardness acquired by the test setting acquirer; and
    a display controller that displays on the display an image picture of the indentation to be formed by indenter before the indentation is formed by the indenter, based on the size of the indentation estimated by the estimator, the image picture being superimposed on the image of the surface of the sample displayed by the display.

2. The hardness tester according to claim 1, comprising:
    an image adjuster that adjusts a size of the image picture displayed by the display controller, and
    a test force adjuster that adjusts the test force based on the size of the image picture adjusted by the image adjuster.

3. The hardness tester according to claim 2, wherein the display controller further displays additional information to express the size of the image picture on the image of the surface of the sample displayed by the display.

4. The hardness tester according to claim 3, wherein:
    the display controller displays the image picture superimposed on a predetermined position outside the test area defined by the test area definer, the predetermined position being in the image of the surface of the sample displayed by the display, and the hardness tester further comprises a test position adjuster that adjusts a display position of the image picture displayed by the display controller at the predetermined position.

5. The hardness tester according to claim 2, wherein:
the display controller displays the image picture superimposed on a predetermined position outside the test area defined by the test area definer, the predetermined position being in the image of the surface of the sample displayed by the display, and
the hardness tester further comprises a test position adjuster that adjusts a display position of the image picture displayed by the display controller at the predetermined position.

6. The hardness tester according to claim 2, wherein the display controller further displays the test force, the hardness tester further comprising a pointing device that allows a worker to manually operate the test force adjuster such that the size of the indentation is adjusted to correspond to the adjusted test force.

7. The hardness tester according to claim 1, wherein the display controller further displays additional information to express the size of the image picture on the image of the surface of the sample displayed by the display.

8. The hardness tester according to claim 7, wherein:
the display controller displays the image picture superimposed on a predetermined position outside the test area defined by the test area definer, the predetermined position being in the image of the surface of the sample displayed by the display, and
the hardness tester further comprises a test position adjuster that adjusts a display position of the image picture displayed by the display controller at the predetermined position.

9. The hardness tester according to claim 1, wherein:
the display controller displays the image picture superimposed on a predetermined position outside the test area defined by the test area definer, the predetermined position being in the image of the surface of the sample displayed by the display, and
the hardness tester further comprises a test position adjuster that adjusts a display position of the image picture displayed by the display controller at the predetermined position.

10. The hardness tester according to claim 1, wherein the test setting acquirer acquires an estimated hardness of the sample and test force estimated before the actual hardness test is performed by the indenter by a manual input through a console by a user.

11. At least one tangible, non-transitory computer-readable medium storing an executable set of instructions for controlling a hardness tester that measures hardness of a sample by forming an indentation by loading a predetermined test force on a surface of the sample with an indenter, and by measuring dimensions of the indentation, wherein the set of instructions, when executed by a computer processor, causes the computer processor to execute operations comprising:

acquiring a captured image of the surface of the sample before the indenter forms the indentation on the sample;
a test area definer defining a test area where the hardness test is to be performed by the indenter with respect to the image of the surface of the sample displayed by a display which displays the acquired image of the surface of the sample before the indenter forms the indentation on the sample;
acquiring an estimated hardness of the sample and test force estimated before the actual hardness test is performed by the indenter;
estimating a size of the indentation to be formed on the surface of the sample by the indenter before the indenter forms the indentation on the sample based on the acquired test force and the acquired estimated hardness;
displaying an image picture of the indentation to be formed by indenter before the indentation is formed by the indenter, based on the size of the estimated indentation; and
superimposing the image picture on the image of the surface of the sample displayed by the display.

12. A hardness tester that measures hardness of a sample by forming an indentation by loading a predetermined test force on a surface of the sample with an indenter, and by measuring dimensions of the indentation, the hardness tester comprising:
a display; and
a controller operably connected to the display and comprising:
an image acquirer configured to acquire an image of the surface of the sample captured by an image capturer before the indenter forms the indentation on the sample, such that the display displays the image of the surface of the sample acquired by the image acquirer before the indenter forms the indentation on the sample;
a test area definer configured to define a test area where the hardness test is to be performed by the indenter with respect to the image of the surface of the sample displayed by the display before the indenter forms the indentation on the sample;
a test setting acquirer configured to acquire an estimated hardness of the sample and test force estimated before the actual hardness test is performed by the indenter;
an estimator configured to estimate a size of the indentation to be formed on the surface of the sample by the indenter before the indenter forms the indentation on the sample based on the test force and the estimated hardness acquired by the test setting acquirer; and
a display controller configured to display an image picture of the indentation to be formed by indenter before the indentation is formed by the indenter, based on the size of the indentation estimated by the estimator, the image picture being superimposed on the image of the surface of the sample displayed by the display.

* * * * *